Dec. 6, 1932.  J. F. DUBY  1,890,218
VEHICLE TIRE SCUFF DETECTOR
Filed Nov. 23, 1931  4 Sheets-Sheet 1
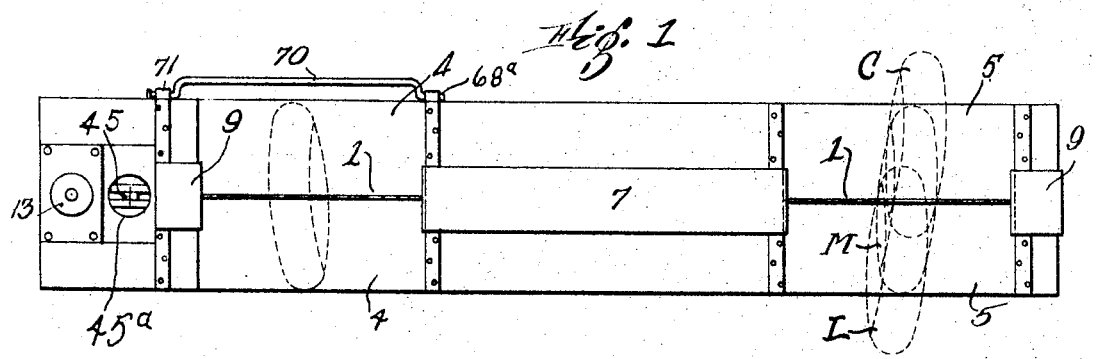
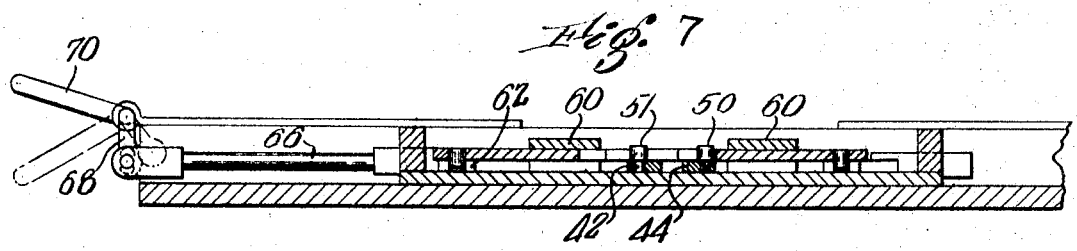
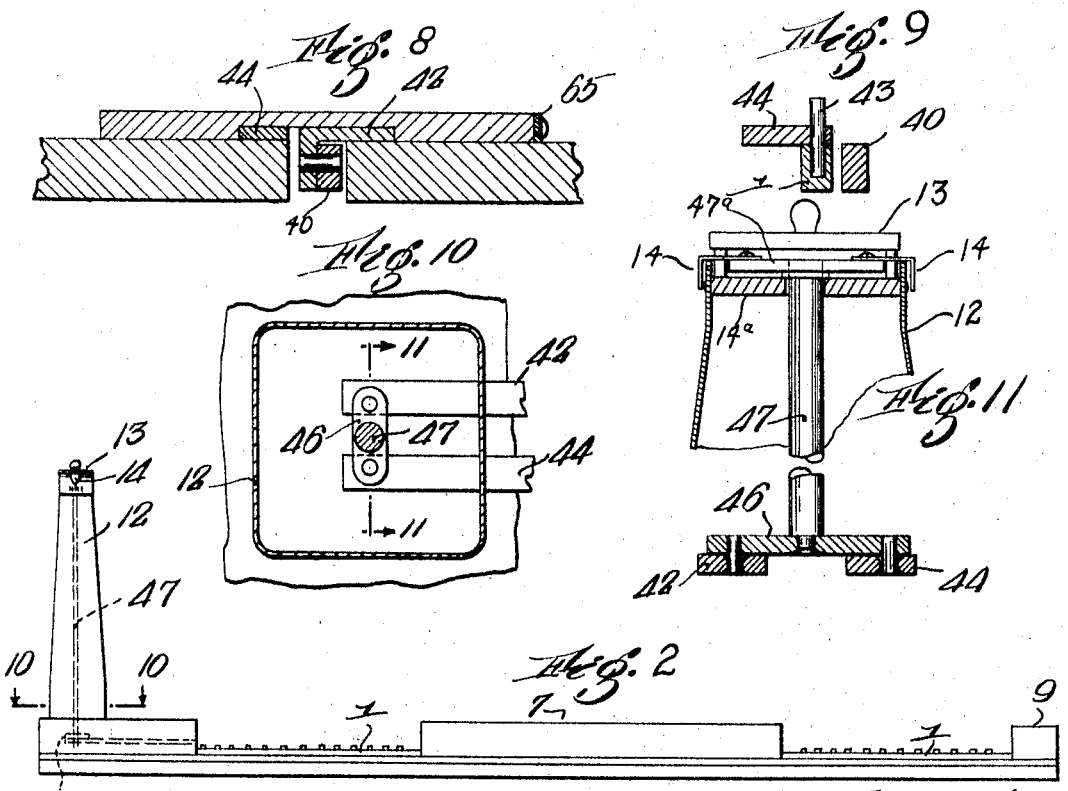

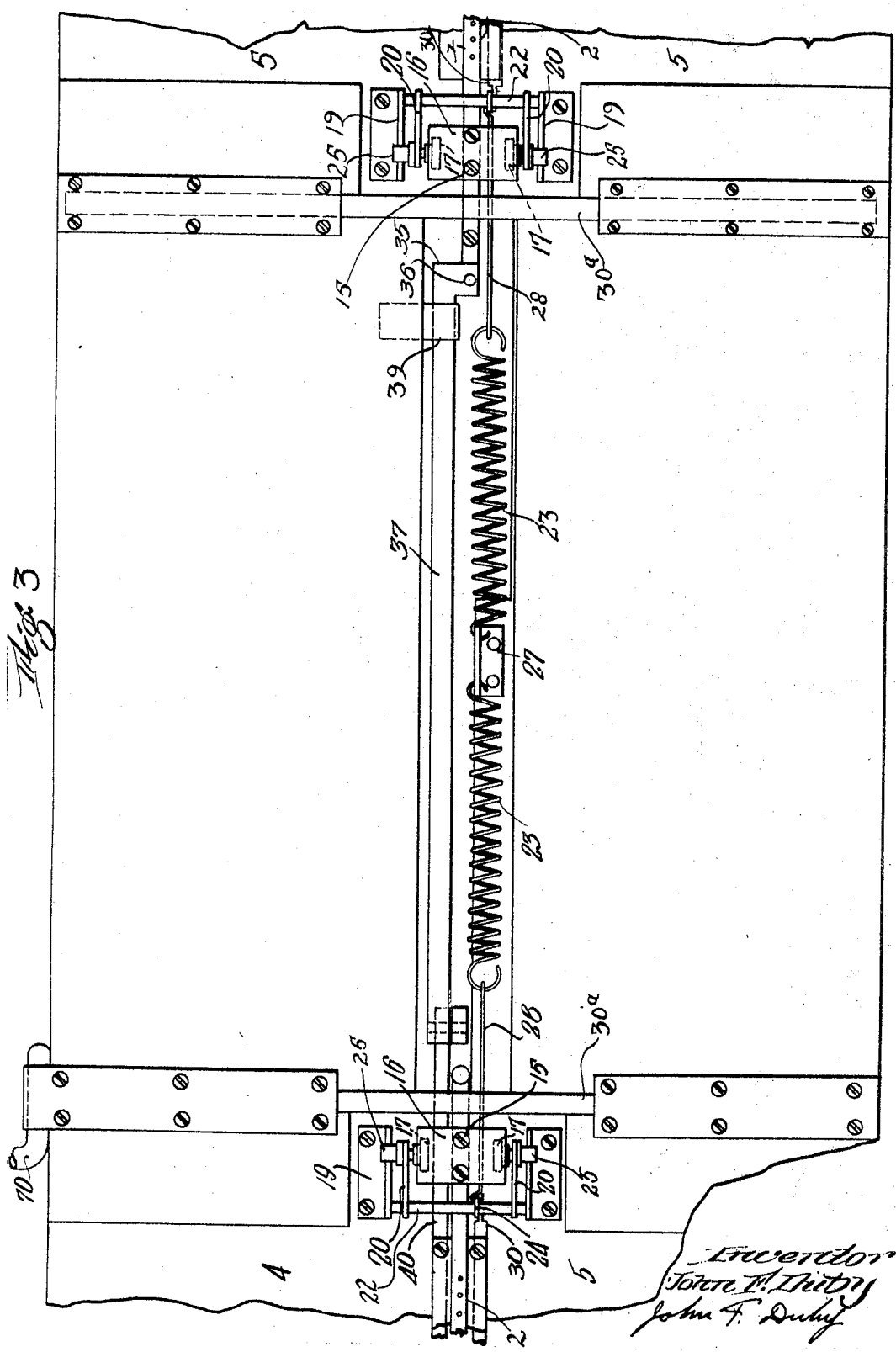

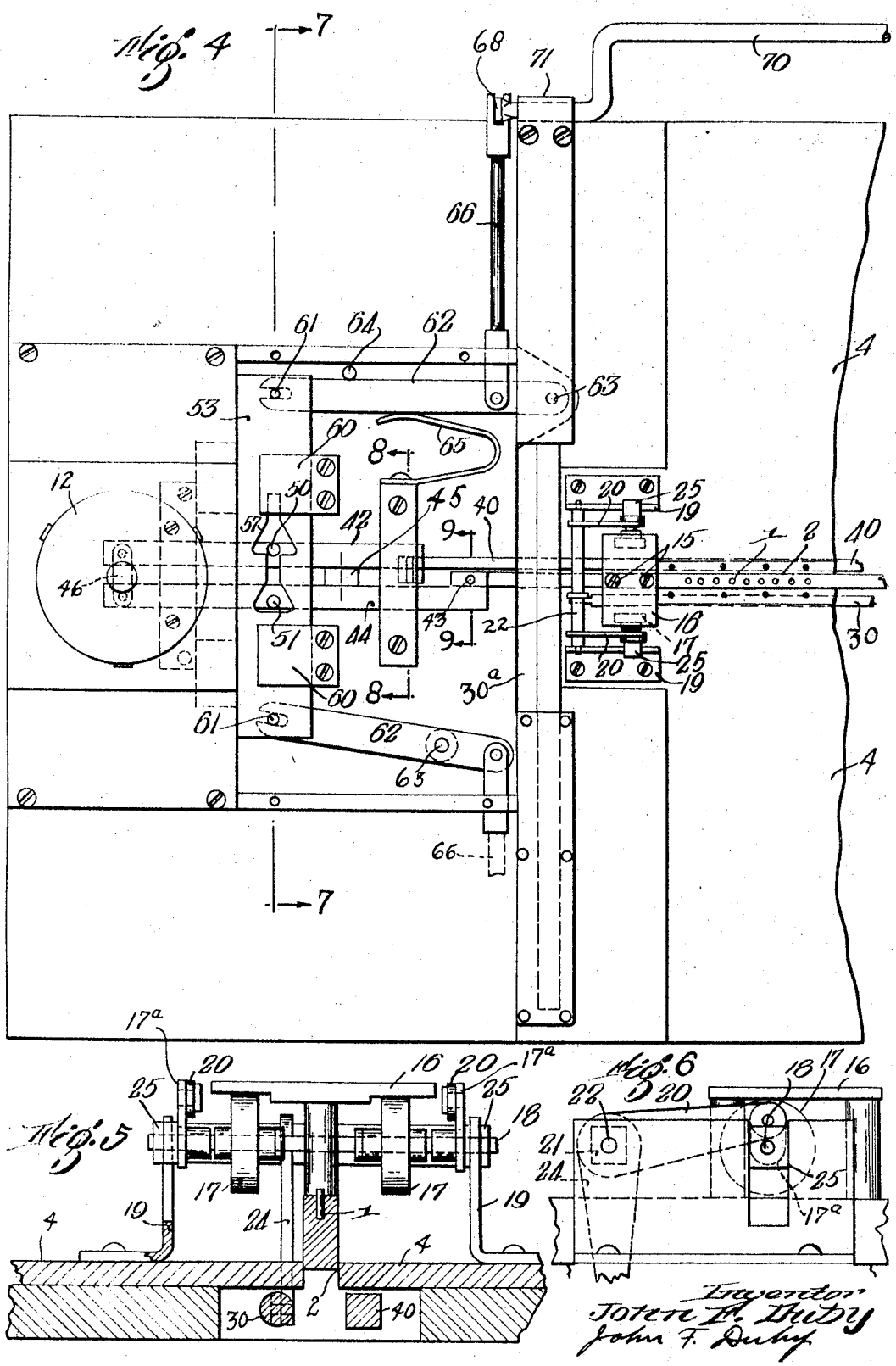

Dec. 6, 1932. J. F. DUBY 1,890,218
VEHICLE TIRE SCUFF DETECTOR
Filed Nov. 23, 1931  4 Sheets-Sheet 4
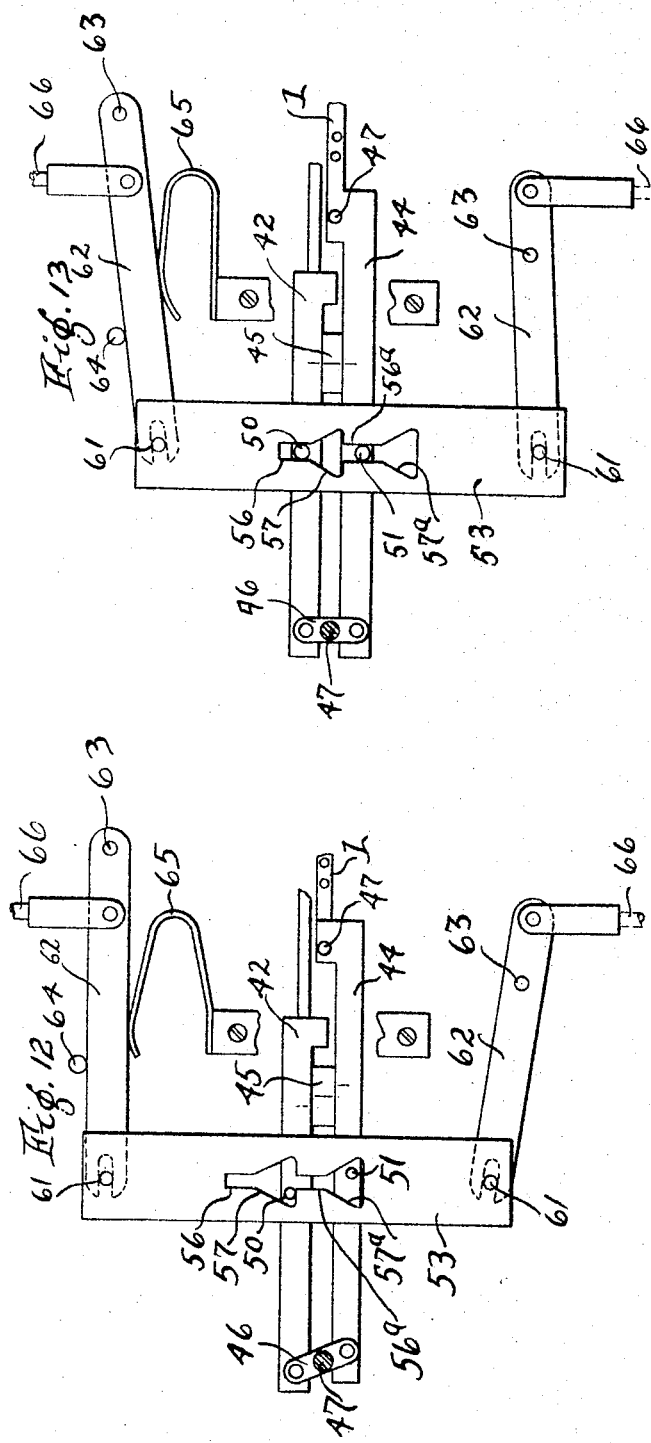
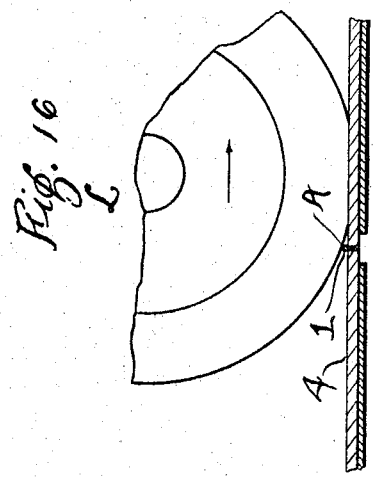
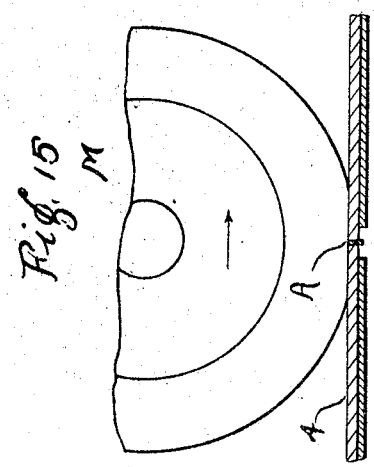
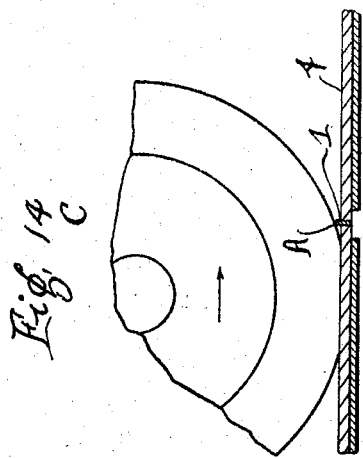
Inventor
John F. Duby Patented Dec. 6, 1932

1,890,218

UNITED STATES PATENT OFFICE

JOHN FABIEN DUBY, OF BOSTON, MASSACHUSETTS

VEHICLE TIRE SCUFF DETECTOR

Application filed November 23, 1931. Serial No. 576,754.

This invention relates to a method of and apparatus for testing the scuffing action between a vehicle tire and the road, whereby the most desirable adjustments may be determined, in order to avoid excessive tire wear and to correct or maintain desired steering conditions.

A great many tests and experiments, conducted by those skilled in the art, have failed to bring about any agreement as to what the relative positions of a pair of wheels should be in regard to the three major items, viz, camber, caster and toe-in. Automotive engineers still differ in their opinions as to the best settings of these three items.

Under present day conditions there is no established degree of angular relationship between the wheels. Therefore, I completely ignore such relationship and test the action of a tire while in actual contact with the road.

Tire wear caused by scuffing, may result from either camber, caster, toe-in, or from a combination of two or more of these items. It may be a fore and aft scuff, due to the smaller diameters at the sides of the tread being dragged along by the larger diameters at the center of the tread, or it may be a lateral scuff. This lateral scuff may be in opposite directions, at the same time, at different points throughout the area of contact with the road. For example: when there is a combination of camber and toe-in there may be a lateral distortion of the tire in one direction at one point, due to camber, and a lateral distortion in the opposite direction at another point, due to toe-in. The lateral distortion caused by camber may be of such a nature that it will not cause any lateral scuffing, due to the fact that the tire resumes normalcy before it reaches a point where scuffing would take place. In this way there may be a distortional force in one direction, which is not harmful, and a scuffing action of equal force in the opposite direction. These forces may be of such a nature that when wheels are tested on the platform type of gage the scuffing action in one direction will be offset by the distortional force in the opposite direction, thereby resulting in no movement of the indicator although scuffing is actually taking place; also certain tire distortions will cause the platform to move and indicate improper angular relationship of the wheels, when as a matter of fact, there is no actual scuffing action taking place.

Elimination of any scuffing action is the only practical way to avoid excessive tire wear and to obtain perfect steering conditions, and it is more practical to apply the test directly to the primary cause of tire wear in each case.

In order to accomplish the above results I provide a structure whereby the tire may be tested under actual road conditions with the wheels always remaining substantially engaged with a fixed supporting surface during the test. Any lateral scuffing in either direction that may take place at any point throughout the area of contact will be shown by the indicator regardless of any opposing forces that may be present at other points.

My device is adapted primarily to detect any lateral scuffing action which may take place at any point throughout the area of contact. The wheels may then be adjusted to eliminate the scuff in a thoroughly satisfactory manner, without any attempt to measure or make special allowances for the various angles involved.

In the accompanying drawings:

Fig. 1 is a plan view of the improved apparatus, various positions of the wheels being diagrammatically indicated;

Fig. 2 is a front elevational view of my improved indication device;

Fig. 3 is a plan view substantially at the center of the apparatus, with cover plates removed;

Fig. 4 is a plan view of one end of the apparatus, on an enlarged scale, certain parts being removed for clearness;

Fig. 5 is a view, partly in section and partly in end elevation, of a portion of the supporting means for one of the depressible elements;

Fig. 6 is a side elevation of a portion of the assembly shown in Fig. 5.

Fig. 7 is a section indicated by line 7—7 of Fig. 4, showing the arrangement of the trip mechanism;

Figs. 8 and 9 are sections indicated by lines 8—8 and 9—9 respectively of Fig. 4.

Fig. 10 is a section indicated by line 10—10 of Fig. 2;

Fig. 11 is a detail view, partly in elevation and partly in section, of a portion of the standard shown in Fig. 2;

Figs. 12 and 13 are views of portions of the trip mechanism, showing the same in different positions; and Figs. 14, 15 and 16 are diagrammatic views showing the relative positions of a wheel and depressible element as the wheel passes over the same.

Referring to the accompanying drawings, and first more particularly to Figs. 1 and 2, it will be seen that my improved apparatus may comprise a pair of transversely disposed depressible bars or elements 1, which may be provided with suitable tire contacting surfaces adapted to insure positive engagement with a given portion of a vehicle tire.

These depressible elements may normally protrude from slots 2 formed in fixed wheel supporting members 4 and 5 and adapted to be engaged by wheels on opposite ends of a vehicle axle tree.

A suitable transverse casing 7 is disposed between the adjoining ends of the elements 1 and contains connecting linkage which will presently be described. Removable covers 9 are disposed at the remote ends of the element 1 and are designed to protect and conceal additional portions of the operating mechanism. At one end of the apparatus, for example, at the left as seen in Figs. 1 and 2, is an upstanding post or standard 12 with a rotatable indicator element 13 at its top provided with a depending pointer 14 which may move past a plurality of graduations disposed near the top of the post 12.

Referring to Figs. 3 to 6 inclusive, each of the elements 1 has its respective ends secured by screw bolts 15 to supporting plates 16. Plates 16 are mounted upon rollers 17 which are rotatable about axles 18, the latter carrying rectangular guide blocks 25 at their ends which are vertically slidable in slots in upstanding brackets 19 which are secured to the frame of the apparatus. The rollers 17 are supported by a pair of links 17ª depending from arms 20 that are fixed upon square portions 21 of shafts 22. The latter have cylindrical end portions that are pivotally received in the upstanding brackets 19. An arm 24 depends from the square portion 21 of each shaft 22. These arms are connected to tension springs 23, said springs being located beneath the transverse cover plate 7, Figs. 1 and 3. The springs 23 may have adjoining ends connected by hooks to a central angle member 27 and may be connected to links 28 which engage the depending arms 24 upon the inner or adjoining shafts 22. The spring 23 should have a tension sufficient to insure a non-slipping engagement between the bars 1 and vehicle tires but this tension should not be great enough to cause the bar to materially diminish the normal frictional engagement between the tire and its supporting surface. Links 30 connect the arms 24 of the inner shafts beneath plate 7 with the corresponding arms of the outer roller end plate assemblies beneath plate 9. Therefore, the element 1 will always be depressed an equal amount throughout its length.

It is thus evident that a vertical force tending to press the bar 1 downwardly will be effective in pulling the plates 16 at the ends of that bar and the rollers 17 downward, thereby rocking the shafts 22, swinging the depending arms 24 and thereby stressing the corresponding spring 23. When such a downwardly acting force is removed from the element 1, the springs 23 will swing the arms 24 and move the rollers 17 upwardly to return the plates 16 and element 1 to their original position as shown in Fig. 6. It is evident that this downward and upward movement of the elements 1 may occur independently of any longitudinal movement thereof which in turn may take place independently of any vertical movement of the bar by plates 16, cooperating with rollers 17. The fixed cross members 30ª, Fig. 3, are adapted to engage bars 1 to limit their upward travel and the frictional engagement therebetween also prevents over-travel of the bar after contact between the tire and the bar has been broken.

Element 1, which is remote from the indicator, has a vertical pin 36 which is slidably received in an opening in the offset end 35 of link 37, the latter sliding in a guide 39. The other element 1 has a vertical pin 43 fixed in its end and slidably received in an opening in an operating link 44, (Figs. 4 and 9).

As shown in Figs. 4 and 10, operating links 42 and 44 are disposed in parallelism and extend beneath the lower end of the hollow standard 12. These links are pivotally connected to a transverse crank bar 46 which is fixed to the lower end of a rod 47 depending from the center of the rotating indicating plate 13. Referring to Fig. 11, at the upper end of rod 47, I provide a pointer carrying disc 47ª, the latter being fixed to said rod. A hub on the disc engages the upper surface of a supporting element 14ª suitably attached to the inner wall of standard 12. An aperture in element 14ª which is slightly greater in diameter than rod 47 permits movement of the lower end of the rod in any horizontal direction.

If both bars move the same amount, in the same direction, there would be a resulting swinging movement of the rod 47 but no rotary movement thereof. If one of the bars moves longitudinally there will be a corresponding movement of its respective end of the crank block 46 and a resultant rotary movement of the rod 47 and pointer 14, but there will be a consequent swinging of the rod 47 at the bottom because the other bar, which has not moved, will then act as a fulcrum. If the two bars move in opposite directions, which is the usual case, the resultant rotary movement of the rod 47 and pointer 14 will indicate the total amount of longitudinal movement of both bars with respect to each other. In addition to pointer 13, I have provided an independent fixed gage block 45 having marker points thereon, which in cooperation with marker points on the links 42 and 44, indicate the actual amount of longitudinal movement of each bar with respect to a fixed point and may be read through aperture 45a, Fig. 1.

The bars 42 and 44 carry upstanding pins 50 and 51 which are received in suitable interconnected slots in a sliding plate 53. As shown in Figs. 12 and 13, the plate 53 has a slot portion 56 with parallel sides spaced to receive the pin 50 and this slot merges into a recess 57 with diverging sides and of generally triangular formation; the base portion of the triangular recess is connected to a second parallel walled slot portion 56a, which in turn is connected to a triangular enlargement 57a. The slot portions 56 and aperture 57 receive the pin 50, while corresponding portions 56a and 57a receive the pin 51. The plate 53 is held in place by clips 60, (Figs. 4 and 7) so that it may slide longitudinally, and its ends are provided with pivot pins 61 engaging slots in levers 62, one of these levers normally being inoperative but being provided so that the trip mechanism may be arranged adjoining either side of the platform member 4. As shown, the ends of levers 62 are mounted upon fixed pivots 63 and one of these levers is engageable with a stop stud 64, a spring 65 normally tending to press this lever against the stop stud.

A link 66 may connect either of these levers 62 to a crank 68 depending from the swinging trip member 70 which may be placed in a wheel engaging position at either edge of member 4, as desired. The body portion of this member consists of a substantially U-shaped bar and is provided with projecting end portions to be received in bearings 71, one end of the bar being bent down to provide the crank 68, as shown in Fig. 7, while the other end of the bar is correspondingly bent to provide a crank 68a when bar 70 is used on the opposite side of member 4. Ordinarily, member 70 is disposed in advance of the wheel supporting surface as shown in Figs. 1 and 7, so that it is readily engageable by the wheel of a vehicle when driven onto the surface, whereupon the trip member 70 will be depressed to the position indicated by dot and dash lines in Fig. 7, thus swinging the crank 68 toward the lever 62 and moving the plate 53 to the position shown in Fig. 13, so that the pins 50 and 51 are moved into the aligned slot portions 56 and 56a, and the operating links 42 and 44 are returned to a position which will cause the crank block 46 to be disposed as shown in Figs. 10 and 13 and consequently the pointers to a zero position.

As soon as the vehicle wheels move out of engagement with the member 70, the spring 65 is effective in returning the lever 62 to its normal position, thus swinging the crank 68 and the member 70 to the full line position of Fig. 6 and also moving the plate 53 to a position wherein the enlarged aperture portions 57 and 57a receive the pins 50 and 51 so that the pins may move transversely of the plate 53 as shown in Figs. 4 and 12.

It will be evident from the above that the elements 1 are positively placed in operating position above the wheel supporting surface, the pointer 14 set at zero, and the marker points on links 42 and 44 brought to registering position with marker point on block 45, just before the elements are engaged by a pair of wheels to be tested. Therefore, no intervening cause can interfere with a correct setting for the test.

In the operation of apparatus of the character described, a vehicle is driven toward the apparatus so that the wheels on an axle tree, as for example the front wheels, after passing over member 70, which brings the pointers to a zero position, may engage the depressible bars 1. For example, the wheels indicated in dot and dash positions C of Fig. 1 are shown in this contacting position. Figs. 14, 15 and 16, illustrate the movement of a vehicle wheel as it rolls over element 1. It may be assumed that the vehicle and its axle are moving in the direction indicated by the horizontal arrows, the tire rolling toward the bar 1 in Fig. 14 until the point A upon its periphery contacts therewith and the wheel is in position C. This point A remains in contact with the bar as the wheel rolls into and through mid-position M, Fig. 15, and then on to position L, shown in Fig. 16. The tire being about to leave the bar 1 which has returned to its uppermost position. Throughout the positions C, M, and L during the period of contact between the bar 1 and a peripheral portion of the tire, there has been no relative movement therebetween. The bar 1 is movable both vertically and longitudinally with the tire during the period of contact; consequently any movement of the element as the tire moves through these positions affords an accurate indication of scuffing action between the tire and the road surface.

Obviously, when two such tire engaging elements are employed with linkage of the type described above, the operating links 42 and 44 may be utilized to cause the pointer 14 to present an indication of the horizontal movement of the bars if there is a scuffing action taking place. In other words, assuming the movement of each bar 1 in a horizontal direction away from the other to be positive, the indicator will show a continuous instantaneous indication of the algebraic sum of the longitudinal movement of both bars throughout the period of contact.

It is evident that my invention provides a device wherein the wheel contacting elements afford a reading which is dependent upon the longitudinal movement of the elements 1 when engaged with a portion of the tire periphery while that portion travels from a position in front of the axle, to a position in back of the axle, without materially lessening the frictional engagement between the tire and its fixed supporting surface. Furthermore, it is evident that the purpose of engaging the tire, slightly before it rolls into contact with the fixed supporting surface and retaining engagement until slightly after it rolls out of contact therewith, is to allow the tire to completely resume its normal shape before it disengages from the bar.

The distance on the periphery of a tire between the flattened portion thereof and the point of tire contact with bar 1 is governed by the normal height of the bar above the tire supporting surface. A reading may be obtained without any vertical movement of the bar; however, I have found that with present day tires, a vertical movement of approximately ¼ inch is more satisfactory, as it will allow the tire to sufficiently resume its normal shape to give an accurate reading, including any distortion which may exist at the point where the tire breaks contact with the road.

It is evident that other forms of bars or blades may be used provided their proportions and arrangements are such as not to materially diminish the normal area of contact or frictional engagement between the tire and its fixed supporting surface.

It will be clear that my device will give an accurate reading if the element 1 is adapted to engage with only one of a pair of wheels, because of the fact that the tires are always in contact with a fixed supporting surface with reference to lateral movement; therefore the element 1 is responsive only to lateral movement of that tire with which it is engaged. Obviously, it is more convenient and time-saving to test both wheels at once.

It should be understood that the present disclosure is for the purpose of illustration only and that this invention includes all modifications and equivalents of a substantially narrow wheel engaging element co-operating with a fixed wheel supporting surface substantially for the purpose set forth herein.

What I claim is:

1. Apparatus of the class described comprising means presenting at least one fixed wheel-supporting surface, a gaging element associated therewith for the purpose set forth, a tire contacting region on said element, said region being movable in a direction lateral to the path of a wheel traversing the supporting surface and element, the width of said region, in the direction of wheel travel, being of a small dimension in contrast with the length of the area of usual tire and road engagement, whereby the presence of the gaging element will cause only a negligible variation from ordinary tire and road contact conditions while a wheel is traversing said surface.

2. Apparatus of the class described comprising a portable unit presenting a fixed wheel-supporting surface, a movable gaging element associated therewith for the purpose set forth, means to indicate the movement of said element, a tire contacting region on said element engageable by a tire and movable element in a direction lateral to the path of a wheel traversing the supporting surface and element, the width of said region, in the direction of wheel travel, being sufficiently less than the length of usual tire engagement with a road for its presence to cause only a negligible variation from normal tire and road contact conditions as a wheel traverses said surface, and means to reset the element to zero position.

3. Apparatus of the class described comprising means presenting a fixed wheel-supporting surface, a gaging element associated therewith for the purpose set forth, a tire engaging portion on said element, said portion being movable by a tire in a direction lateral to the path of a wheel traversing the supporting surface and element, the width of said portion in the direction of wheel travel being of a small dimension in contrast with the length of usual tire engagement with a road surface, and means associated with the tire-engaging portion of the element to indicate any lateral movement of said portion.

4. Apparatus of the class described comprising means presenting a fixed wheel-supporting surface, a movable gaging element associated therewith for the purpose set forth, a tire engaging region on said element, said region being movable by a tire in a direction lateral to the path of a wheel traversing the supporting surface and element, the width of said region in the direction of wheel travel being of a small dimension in contrast with the length of usual tire engagement with a road surface, means to indicate any lateral movement of said gaging element, and means to retain said indication when a tire becomes disengaged with the element.

5. Apparatus of the class described comprising means presenting a fixed wheel-supporting surface, a movable gaging element cooperating therewith to detect undesirable movement of a wheel tire laterally to its path of travel and relative to said surface, said element being depressible when traversed by a wheel, means yieldably supporting said element above said surface, the exposed region of said element being of small proportions in the direction of wheel travel so as to leave a substantial amount of the tire in engagement with the fixed supporting surface during the traversing operation, and means to indicate any lateral movement of said element.

6. Apparatus of the class described comprising means presenting a fixed wheel-supporting surface, a movable gaging element associated therewith for the purpose set forth, a tire engaging region on said element being movable in a direction lateral to the path of a wheel traversing the supporting surface and element, the width of said region, in the direction of wheel travel, being of a small dimension in contrast with the length of usual tire engagement with a road surface, said element being normally positioned above said supporting surface, and yieldable supporting means for said element whereby it may be depressed when traversed by a vehicle wheel.

7. The method of detecting undesirable movements between a vehicle tire and the road in a direction lateral to the path of vehicle travel, which consists of moving the vehicle forward while maintaining approximately the normal degree of frictional engagement between the tires and a fixed supporting surface, providing a laterally displaceable element associated with said surface and utilizing any such movement of the tire to actuate said element.

8. The method of detecting undesirable movement between a vehicle tire and the road, which consists of rotating a pair of wheels on their axes, thereby causing a given portion on the tire periphery to roll into and out of contact with a wheel supporting surface which is not movable in response to the lateral thrust of a tire, providing a laterally displaceable element to contact with said portion and measuring any movement of said element in a direction lateral to the wheel plane and relative to said surface during such wheel rotation.

9. The method of eliminating undesirable movements of a vehicle tire relative to a road surface, which consists of providing an element associated with a fixed wheel-supporting surface and operable in response to lateral movement of the tire, moving the vehicle forward causing a pair of wheels to roll along said fixed supporting surface while maintaining substantially the normal degree of frictional engagement therewith until a given point on the tire periphery rolls into and out of contact with said element, gaging the amount of lateral movement of the element and subsequently making necessary adjustments of vehicle parts to prevent tire scuffing.

10. Apparatus of the class described comprising means presenting fixed supporting surfaces for a pair of wheels, a gaging element associated with each supporting surface, said element being movable laterally to a wheel plane in response to tire scuffing action, vertically yieldable supporting means for said elements, a tire contacting region on each of said elements, the width of said region in the direction of wheel travel being proportionately narrow in contrast with the length of usual tire engagement with a road surface, means to indicate the amount of transverse movement of the gaging elements, and means to return said elements to the zero indicating position.

11. Apparatus of the class described comprising means presenting fixed supporting surfaces for a pair of wheels, a gaging element associated with each supporting surface, each element being independently movable laterally to a wheel plane in response to tire scuffing action, a tire contacting region on each of said elements, the width of said region in the direction of wheel travel being of a small dimension in contrast with the length of usual tire engagement with a road surface, an indicator to show the net relative movement of the gaging elements, and means for utilizing the independent transverse movement of each gaging element to actuate said indicator.

12. Apparatus of the class described comprising means presenting fixed supporting surfaces for a pair of wheels, a gaging element associated with each supporting surface, said element being movable laterally to a wheel plane in response to tire scuffing action, a tire contacting region on each of said elements, the width of said region in the direction of wheel travel being of a small dimension in contrast with the length of usual tire engagement with a road surface, an indicator, means connecting the indicator to each gaging element, and means to reset the elements to a zero indicating position.

13. Apparatus of the class described comprising means presenting fixed supporting surfaces for a pair of wheels, a gaging element associated with each supporting surface, said element being movable laterally to a wheel plane in response to tire scuffing action, a tire contacting region on each of said elements, the width of said region in the direction of wheel travel being of a small dimension in contrast with the length of usual tire engagement with a road surface, an indicator, means connecting each element to the indicator, and means to prevent over-travel of the elements and retain the indication.

14. Apparatus of the class described comprising means presenting fixed supporting surfaces for a pair of wheels, a gaging element associated with each supporting surface, said element being movable laterally to a wheel plane in response to tire scuffing action, a tire contacting region on each of said elements, the width of said region in the direction of wheel travel being of a small dimension in contrast with the length of usual tire engagement with a road surface, and means to prevent over-travel of the gaging elements.

15. Apparatus of the class described, comprising a pair of wheel supporting surfaces, a pair of spaced tire contacting elements, supporting means for the latter normally holding the elements above the supporting surfaces, means provided for longitudinal movement of the elements independently of perpendicular movement, a pair of links connected to the respective elements, a standard at one side of the elements, an indicator supported by the standard, means operably connecting the links with the indicator including a crank member cooperating with a pendulously mounted rod, whereby the indicator is caused to present a reading of the relative movement between the elements.

16. Apparatus of the class described, comprising a pair of wheel supporting surfaces, a pair of spaced tire contacting elements, supporting means for the latter normally holding the elements above the supporting surfaces, means provided for longitudinal movement of the elements independently of perpendicular movement, a pair of links connected to the respective elements, a standard at one side of the elements, an indicator supported by the standard, means operably connecting the links with the indicator including a crank member cooperating with a pendulously mounted rod, whereby the indicator is caused to present a reading of the relative movement between the elements, friction means adapted to prevent over-travel after the elements have broken contact with a pair of tires, trip mechanism operable by contacting with a vehicle part, said last mentioned mechanism including a movable plate having cam slots, whereby the links and associated parts may be re-set to a zero indicating position.

17. Apparatus of the class described comprising means presenting fixed supporting surfaces for a pair of wheels, a gaging element associated with each supporting surface, said element being movable laterally to a wheel plane in response to tire suffing action, vertically yieldable supporting means for said elements, means to yieldingly resist free downward movement of said elements, an indicator and operable connections therewith to show the relative lateral movement of the elements, and means to reset said elements to a zero position.

18. Apparatus of the class described comprising means presenting a fixed wheel-supporting surface, means movable laterally to a wheel plane adapted for frictional contact with a tire periphery to detect certain scuffing action between said surface and the tire as the latter traverses said surface while in approximately full frictional contact with the fixed surface, means to indicate lateral movement of said detecting means, and operable connections between said indicating means and said detecting means.

19. Apparatus of the class described comprising means presenting a fixed wheel-supporting surface for each of a pair of vehicle wheels, a gaging element cooperating with each surface and being mounted for lateral movement in response to certain lateral tire scuffing action, said elements by nature of their proportions being adapted to frictionally engage with a tire during a test without materially diminishing the normal degree of frictional engagement between the tire and its fixed supporting surface, each of said gaging elements being free to move independently of the other.

JOHN FABIEN DUBY.